US012759149B2

(12) United States Patent
Wollstadt et al.

(10) Patent No.: US 12,759,149 B2
(45) Date of Patent: Oct. 13, 2026

(54) CONTROLLING A ROBOT BASED ON AN OPTIMIZED COOPERATION WITH OTHER AGENTS

(71) Applicant: Honda Motor Co., Ltd., Tokyo (JP)

(72) Inventors: Patricia Wollstadt, Offenbach (DE); Christiane Wiebel-Herboth, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 662 days.

(21) Appl. No.: 18/192,667

(22) Filed: Mar. 30, 2023

(65) Prior Publication Data

US 2023/0347522 A1 Nov. 2, 2023

(30) Foreign Application Priority Data

Mar. 31, 2022 (EP) .................................... 22165813

(51) Int. Cl.
*B25J 9/16* (2006.01)
*B25J 13/08* (2006.01)
(Continued)

(52) U.S. Cl.
CPC ............. *B25J 9/1669* (2013.01); *B25J 13/08* (2013.01); *G05B 19/4155* (2013.01); *G06F 3/015* (2013.01); *G05B 2219/50391* (2013.01)

(58) Field of Classification Search
CPC ........ B25J 9/1669; B25J 13/08; B25J 9/1682; B25J 9/1664; G05B 19/4155;
(Continued)

(56) References Cited

U.S. PATENT DOCUMENTS 7,082,351 B2 * 7/2006 Hara ...................... B25J 9/1682 700/250
9,592,609 B2 * 3/2017 LaFary .............. G05B 19/4061
(Continued)

FOREIGN PATENT DOCUMENTS

EP 3511130 7/2019

OTHER PUBLICATIONS

Abdullah Makkeh et al., "Introducing a differentiable measure of pointwise shared information", Physical Review E, Mar. 30, 2021, pp. 1-19, vol. 103, No. 032149.
(Continued)

*Primary Examiner* — Wade Miles
*Assistant Examiner* — James Brian Chin
(74) *Attorney, Agent, or Firm* — JCIPRNET

(57) ABSTRACT

A method for controlling at least one autonomous device which is one of at least two agents that cooperatively perform a common task in a common environment is provided. The method comprises: obtaining variables on a current state of each agent in the common environment, and obtaining a further variable on a current state of the common environment that describes a distance of the current state of the agents to a common goal state or a task success; determining a quantitative measure for cooperative behaviour of the agents that quantifies an extent to which a mutual support or an adaption in joint cooperative actions towards the common goal state increases a joint action space of the agents; optimizing a joint behaviour of the agents using the quantitative measure based on the obtained variables to determine an action of the autonomous device; and outputting a control signal for controlling the action.

18 Claims, 5 Drawing Sheets

(51) Int. Cl.
*G05B 19/4155* (2006.01)
*G06F 3/01* (2006.01)

(58) Field of Classification Search
CPC .......... G05B 2219/50391; G05B 2219/39116; G05B 2219/39146; G05B 2219/39157; G05B 2219/40202; G06F 3/015
See application file for complete search history.

(56) References Cited

U.S. PATENT DOCUMENTS

| | | | | |
|---|---|---|---|---|
| 9,649,766 | B2 * | 5/2017 | Stubbs | G05D 1/0261 |
| 10,142,410 | B2 * | 11/2018 | Giffin | H04L 67/52 |
| 10,899,017 | B1 * | 1/2021 | De Sapio | B25J 11/008 |
| 12,350,842 | B2 * | 7/2025 | Greenberg | B25J 9/1676 |
| 2003/0105534 | A1 * | 6/2003 | Hara | G05D 1/104 700/2 |
| 2005/0216182 | A1 * | 9/2005 | Hussain | G01C 21/20 701/532 |
| 2007/0112700 | A1 * | 5/2007 | Den Haan | G05D 1/027 706/14 |
| 2010/0087955 | A1 * | 4/2010 | Tsusaka | B25J 9/0003 700/245 |
| 2011/0035050 | A1 * | 2/2011 | Kim | G05D 1/0214 901/1 |
| 2012/0281907 | A1 * | 11/2012 | Samples | G06V 20/64 382/159 |
| 2013/0123980 | A1 * | 5/2013 | Seo | G05D 1/0027 700/248 |
| 2014/0342834 | A1 * | 11/2014 | Tappeiner | A63F 13/00 463/42 |
| 2015/0352719 | A1 * | 12/2015 | Nakazato | G05B 19/4183 700/253 |
| 2016/0129592 | A1 * | 5/2016 | Saboo | B25J 19/021 700/248 |
| 2016/0234206 | A1 * | 8/2016 | Tunnell | H04L 63/0428 |
| 2016/0271800 | A1 * | 9/2016 | Stubbs | G05D 1/0214 |
| 2017/0028553 | A1 * | 2/2017 | Tsuda | G06N 3/098 |
| 2019/0105779 | A1 * | 4/2019 | Einav | B25J 9/1689 |
| 2019/0291277 | A1 * | 9/2019 | Oleynik | B25J 9/1669 |
| 2020/0175761 | A1 * | 6/2020 | Jones | G06F 3/016 |
| 2020/0282549 | A1 * | 9/2020 | Torii | B25J 9/1661 |
| 2021/0027058 | A1 * | 1/2021 | Ma | B25J 9/1661 |
| 2021/0053407 | A1 * | 2/2021 | Smith | B25J 19/021 |
| 2021/0309264 | A1 * | 10/2021 | Felip Leon | B25J 9/1666 |
| 2022/0153298 | A1 * | 5/2022 | Wang | G06N 3/08 |

OTHER PUBLICATIONS

"Search Report of Europe Counterpart Application", issued on Sep. 23, 2022, pp. 1-15.
Arash Ajoudani et al., "Progress and Prospects of the Human-Robot Collaboration", Autonomous Robots, Oct. 31, 2017, pp. 1-17.
Heni Ben Amor et al., "Interaction Primitives for Human-Robot Cooperation Tasks", 2014 IEEE International Conference on Robotics and Automation (ICRA), May 31, 2014-Jun. 7, 2014, pp. 1-7.
Klaus Bengler et al., "Interaction Principles for Cooperative Human-Machine Systems", it—Information Technology Aug. 2012, pp. 1-6.
Jenay M. Beer et al., "Toward a Framework for Levels of Robot Autonomy in Human-Robot Interaction", Journal of Human-Robot Interaction, Jul. 10, 2014, pp. 74-99, vol. 3, No. 2.
Judith Bütepage et al., "Human-Robot Collaboration: From Psychology to Social Robotics", retrieved from arXiv database, arXiv:1705.10146v1 [cs.RO], May 29, 2017, pp. 1-35.
Hande Çelikkanat et al., "Steering self-organized robot flocks through externally guided individuals", Neural Computing and Applications, Sep. 2010, pp. 1-17.
Gregory Dudek et al., "A Taxonomy for Multi-Agent Robotics", Autonomous Robots, Dec. 1996, pp. 5-29.
Mohamed Elbanhawi et al., "Sampling-Based Robot Motion Planning: A Review", IEEE Access, Feb. 2014, pp. 2-23.
Rinat R. Galin et al., "Human-Robot Interaction Efficiency and Human-Robot Collaboration", Robotics: Industry 4.0 Issues & New Intelligent Control Paradigms, Jan. 7, 2020, pp. 55-63.
Alessandro Gasparetto et al., "Trajectory Planning in Robotics", Mathematics in Computer Science, Aug. 30, 2012, pp. 1-11.
R. Brent Gillespie et al., "A General Framework for Cobot Control", IEEE Transactions on Robotics and Automation, Aug. 2001, pp. 391-401, vol. 17, No. 4.
A. J. Gutknecht et al., "Bits and pieces: understanding information decomposition from part-whole relationships and formal logic", Proceedings of the Royal Society A, Mathematical, Physical and Engineering Sciences, Jul. 7, 2021, pp. 1-28.
Nikolaus Hansen, "The CMA Evolution Strategy: A Comparing Review", Studies in Fuzziness and Soft Computing, Jun. 2007, pp. 75-102.
Marc Hassenzahl et al., "Convenient, Clean, and Efficient? The Experiential Costs of Everyday Automation", NordiCHI '14, Oct. 26, 2014-Oct. 30, 2014, pp. 1-10.
Jeffrey Heer, "Agency plus automation: Designing artificial intelligence into interactive systems", PNAS, Feb. 5, 2019, pp. 1844-1850, vol. 116, No. 6.
Mario Hermann et al., "Design Principles for Industrie 4.0 Scenarios: A Literature Review", Working Paper No. 01 / 2015 , Jan. 2015, pp. 3-16.
Jean-Michel Hoc, "Towards a cognitive approach to human-machine cooperation in dynamic situations", Int. J. Human-Computer Studies, Feb. 21, 2001, pp. 509-540, vol. 54.
Brian Ichter et al., "Learning Sampling Distributions for Robot Motion Planning", retrieved from arXiv database, arXiv:1709.05448v3 [cs.RO], Mar. 12, 2019, pp. 1-25.
Shuhei Ikemoto et al., "Physical Human-Robot Interaction: Mutual Learning and Adaptation", IEEE Robotics & Automation Magazine, Mar. 2012, pp. 1-13.
Ryojun Ikeura et al., "Variable Impedance Control of a Robot for Cooperation with a Human", Proceedings of 1995 IEEE International Conference on Robotics and Automation, May 21, 1995-May 27, 1995, pp. 3097-3102.
Steven M. Lavalle, "Planning Algorithms", Aug. 2009, Available for downloading at: http://planning.cs.uiuc.edu/, pp. 1-1007, Cambridge University Press.
H. Kazerooni, "Human-Robot Interaction via the Transfer of Power and Information Signals", IEEE Transactions on Systems, Man, and Cybernetics, Mar./Apr. 1990, pp. 450-463, vol. 20, No. 2.
Ari Kolbeinsson et al., "Foundation for a classification of collaboration levels for human-robot cooperation in manufacturing", Production & Manufacturing Research, Jul. 25, 2019, pp. 448-471, vol. 7, No. 1.
Zachary Kingston et al., "Sampling-Based Methods for Motion Planning with Constraints", Annual Review of Control, Robotics, and Autonomous Systems, May 2018, pp. 3.1-3.27.
Abdullah Makkeh et al., "BROJA-2PID: A robust estimator for bivariate partial information decomposition", retrieved from arXiv database, arXiv:1802.02485v1 [math.OC], Feb. 7, 2018, pp. 1-19.
Abdullah Makkeh et al., "Introducing a differentiable measure of pointwise shared information", retrieved from arXiv database, arXiv:2002.03356v5 [cs.IT], Mar. 30, 2021, pp. 1-19.
Eric Meisner et al., "ShadowPlay: A Generative Model for Non-verbal Human-Robot Interaction", HRI'09, Mar. 11, 2009-Mar. 13, 2009, pp. 1-9.
George Michalos et al., "Design considerations for safe human-robot collaborative workplaces", Procedia CIRP 37, Dec. 2015, pp. 248-253.
Alberto Montebelli et al., "Reframing HRI Education: A Dialogic Reformulation of HRI Education to Promote Diverse Thinking and Scientific Progress", Journal of Human-Robot Interaction, Sep. 2017, pp. 3-26, vol. 6, No. 2.
Kyle Schick-Poland et al., "A partial information decomposition for discrete and continuous variables", retrieved from arXiv database, arXiv:2106.12393v2 [cs.IT], Jun. 24, 2021, pp. 1-24.
Alessandra Sciutti et al., "Measuring Human-Robot Interaction Through Motor Resonance", Int J Soc Robot, Mar. 16, 2012, pp. 223-234, vol. 4.

(56) References Cited

OTHER PUBLICATIONS

Bernhard Sendhoff et al., "Cooperative Intelligence—A Humane Perspective", 2020 IEEE International Conference on Human-Machine Systems (ICHMS), Sep. 7, 2020-Sep. 9, 2020, pp. 1-6.
S. H. Tang et al., "A Review on Robot Motion Planning Approaches", Pertanika J. Sci. & Technol., Jan. 2012, pp. 15-29, vol. 20, No. 1.
Kamil F et al., "A Review on Motion Planning and Obstacle Avoidance Approaches in Dynamic Environments", Advances in Robotics & Automation, Jan. 2015, pp. 1-8, vol. 4 , No. 2, 1000134.
Danesh Tarapore et al., "Fingerprinting Agent-Environment Interaction via Information Theory", The Eighth International Conference on Intelligent Autonomous Systems (IAS-8), Jan. 2004, pp. 1-9.
Danesh Tarapore et al., "Quantifying Patterns of Agent-Environment Interaction", Preprint submitted to Elsevier Science, May 17, 2004, pp. 1-14.
Ales Vysocky et al., "Human—Robot Collaboration in Industry", MM Science Journal, Jun. 2016, pp. 903-906.
Paul L. Williams et al., "Nonnegative Decomposition of Multivariate Information", retrieved from arXiv database, arXiv:1004.2515v1 [cs.IT], Apr. 14, 2010, pp. 1-14.
Michael Gienger et al., "Human-Robot Cooperative Object Manipulation with Contact Changes", 2018 IEEE/RSJ International Conference on Intelligent Robots and Systems (IROS), Oct. 1, 2018-Oct. 5, 2018, pp. 1-7.

* cited by examiner

CONTROLLING A ROBOT BASED ON AN OPTIMIZED COOPERATION WITH OTHER AGENTS

CROSS-REFERENCE TO RELATED APPLICATION

This application claims the priority benefit of European application serial no. 22165813.1, filed on Mar. 31, 2022. The entirety of the above-mentioned patent applications are hereby incorporated by reference herein and made a part of this specification.

TECHNICAL FIELD

The disclosure relates to the field of robotics, in particular to methods for controlling an autonomous device and performing motion planning for the autonomous device cooperating with other agents in performing shared tasks in a common environment.

TECHNICAL BACKGROUND

Multi-contact motion planning for a robotic system requires finding a contact sequence and a motion for performing a movement task with changing contacts between the robotic system and physical structures in the environment. The robotic system corresponds to an autonomously operating device (autonomous device, robot) or an autonomously operating agent (agent). The agent encompasses also a human operator present in the environment of the robotic system and intending to perform a shared task with the robotic system.

Traditionally, robotic systems work in isolated workspaces that are strictly separated from human operators. The robotic system operates in a mode of operation that is characterized by an interaction that could be define the robotic system as a tool controlled by the operator and the mode of operation enables no direct interaction between the robotic system and the operator.

Industries in the healthcare sector, the logistics and production sector, or the service sector explore the use of novel robotic systems employing collaborative robots. Collaborative robotic systems share their workspace with humans and are, as standard ISO/TS 15066:2016 states, "intended to physically interact with humans" in the shared workspace.

A new generation of robotic system has enhanced proprioception sensing capabilities and enables vastly improved actuation control. The new generation operates in a mode of operation, which includes the robotic system and other agents—another agent may include the human operator, or another robot—in a shared workspace that enables and even requires interaction and collaboration between the robotic system and the other agent.

The mode of collaboration between the robotic system and the operator requires new procedures for behaviour planning for the robotic system. In order to maximize the effectiveness of the collaborative robotic system, the robotic system has to operate cooperatively for optimally adapting to a behaviour and the abilities of the collaborating agent and to complement the collaborating agent wherever necessary and possible. Behaviour planning for robotic systems moves towards design of interactive, collaborative robotic systems that are capable of performing cooperative actions towards a common goal shared with another agent.

In particular, executing behaviour planning for robotic systems is a challenge, which is insufficiently addressed by current approaches.

Hence, an online control mechanism that optimizes a cooperative behaviour of the robotic system towards preforming with collaborating agent(s) and towards achieving a shared goal with the collaborating agent(s) is desirable.

A method for controlling at least one autonomous device for cooperatively performing a common task in a common environment with other agents according to the first aspect addresses the cited issues.

SUMMARY OF THE INVENTION

In the method for controlling at least one autonomous device according to the first aspect, the autonomous device is at least one of at least two agents that cooperatively perform a common task in a common environment. The method comprises obtaining variables on a current state of each of the at least two agents in the common environment and obtaining a variable on at least one current state of the common environment. The variable describes a distance of the current state of the at least two agents to a common goal state or to a task success. The method determines a quantitative measure for cooperative behaviour of the at least two agents, wherein the quantitative measure quantifies an extent to which a mutual support or an adaption in joint cooperative actions towards the common goal state increases a joint action space of the at least two agents. Then the method optimizes a joint behaviour of the at least two agents using the determined quantitative measure based on the obtained variables of the current states of the at least two agents and the obtained further variable on the current state of the common environment and determines at least one action of the autonomous device based on the optimized joint behaviour. The method outputs a control signal for controlling the determined at least one action.

The method enables to act cooperatively and therefore enables the cooperative robotic system to increase task efficiency or even to enable fulfilling the shared task. The method therefore has the potential to increase user satisfaction and to reduce the costs involved with performing the shared task.

The disclosure achieves a design of a controller that enables cooperative behaviour in robotic systems for physical collaboration between the robotic system and the at least one further agent. The method uses a measure of cooperative behaviour that the controller applies in order to optimize the behaviour of the autonomous device. The cooperative behaviour refers to two or more agents acting together towards a shared goal, while agents mutually adapt their behaviour in order to facilitate the realization of the shared goal by complementing the other agents' abilities.

Current procedures for robot motion planning assumes that the robot acts in isolation, in particular, independently of a further agent, including also human operators. Existing procedures for collaborative robot motion planning are strictly tailored to specific use cases and do not provide a general approach to cooperative robot motion planning, independent of the specific task they were designed for. The method provides an approach to robot motion planning that extends beyond a narrow use case with respect to task and possible actions of the robot. The method for controlling behaviour planning for the robot is maximally cooperative in interactive tasks with a human due to the quantitative description of cooperative behaviour.

The disclosure proposes a method for cooperative robot motion planning that comprises two parts. First, it defines a generic measure of cooperative behaviour that is applicable in a wide range of cooperative scenarios. The defined measure quantifies the degree of cooperative behaviour in scenarios, where two agents work together towards a shared goal. Second, based on the introduced generic measure of cooperation, the method combines the generic measure with an approach to plan robot motion such as to maximize the proposed cooperation measure and thus also the cooperative behaviour between human and agent. Designing the controller for cooperative behaviour planning guides the autonomous device to behave in a maximally cooperative fashion, therefore resulting in a system behaviour that facilitates task success and efficiency by making optimal use of the abilities of all agents involved in a flexible manner. The implemented method results in a cooperative system, which can be expected to have a high usability, to lead to a reduction of cost for achieving the shared goals and to increase user acceptance.

The method according to the first aspect is in particular a computer-implemented method.

BRIEF DESCRIPTION OF THE DRAWINGS

Embodiments of the disclosed method are explained in more detail with reference to the drawings, wherein.

Figure 1:
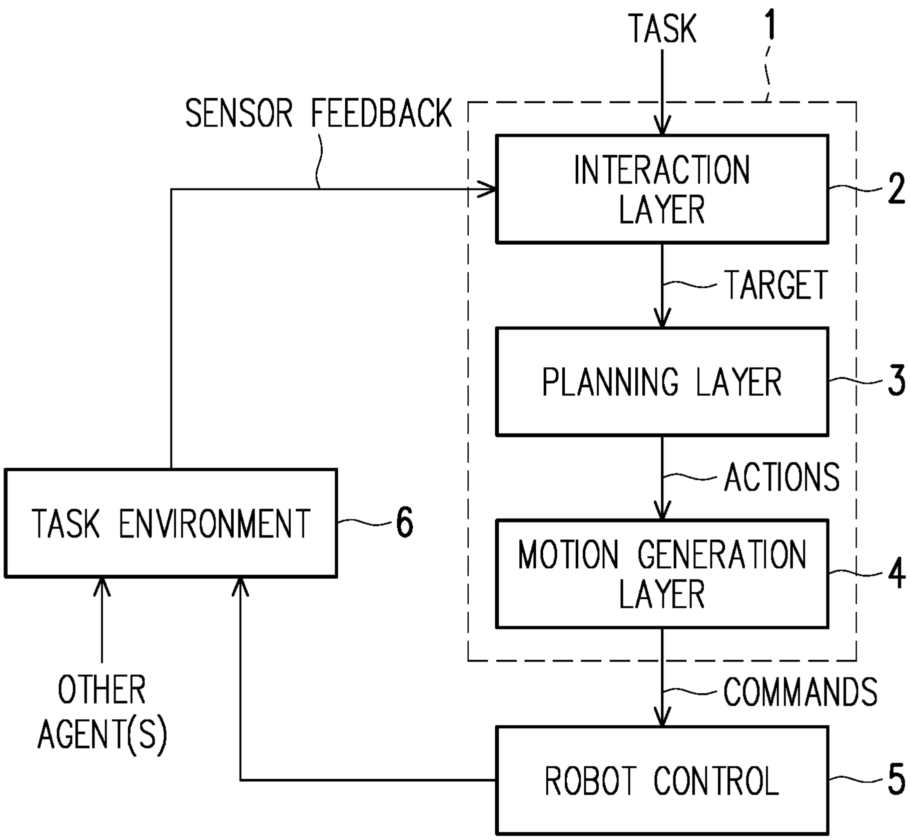
FIG. 1 illustrates the process of motion planning for a robot cooperating with other agent(s) in an exemplary application of an embodiment.

Same or corresponding features are denoted in the figures by same reference signs. The description uses terms known in the art of robotics. For convenience, some short references are provided before discussing examples of the disclosed method in more detail with reference to the drawings.

DETAILED DESCRIPTION OF EMBODIMENTS

Before discussing embodiments, some specific terms are shortly introduced in order to support the subsequent discussion of the figures.

The term synergy describes a joint contribution of two or more input variables towards a target, and in particular denotes the part of the contribution that can be exclusively obtained when considering all inputs together, and cannot be obtained from any single input or any subset of inputs alone.

An autonomous device, robot or robotic system, is an artefact whose configuration of sensors, actuators, and integrated control system provides a significant level of flexible, independent, and autonomous action.

The term autonomy describes the extent to which the robot can sense the environment, plan based on that environment, and act upon that environment, with the intent of reaching some goal without external control. The goal or task may either be given to the robot or created by the robot.

The term cooperation used throughout this document encompasses at least two agents acting together towards achieving a shared goal, while all agents adapt to the state and the actions of at least one other agent in a manner that facilitates the realization of the shared goal. Each of the agents requires for this adaptation a model of itself and of the at least one other agent with respect to the actions that are relevant for achieving the shared goal. The development and maintenance of the models requires mutual transparency of relevant variables for the cooperating agents. Each agent has an objective, which is determined by intention or design that drives adapted operation in favour of achieving the shared goal. The objectives of the agents can, but do not have to be shared as long as they drive operations that are compatible with approaching the cooperation goal.

The method assumes a level of autonomy of the autonomous device, that actions of the other agent and adapts its own behaviour accordingly by selecting from a sufficiently large range of possible actions. Collaboration denotes the at least two agents working towards the common goal, but without a mutual adaption of their actions such that the behaviour of the individual agent is independent of the current actions of the respective other agent.

Cooperation is considered as a special case of collaboration. Collaboration is characterized by working towards a shared goal, but subtasks are independent, while cooperation is characterized by interdependent subtasks that require shared representations and mutual adaption of the agents.

Partial Information Decomposition (PID) refers to decomposing information provided by two or more inputs on a common target into redundant information, unique information, and synergistic information. Redundant information is provided by all inputs, unique information by individual inputs only, and synergistic information can only be obtained by considering all inputs jointly.

Information theory is a scientific field concerned with the quantification of information, as well as its storage and transfer. Originally conceived in the area of telecommunication, methods and measures originating in the field of information theory are currently widely used for data analysis.

Implementation of the method may use recent procedures from information theory to measure cooperative behaviour by observing both the actions of the cooperating agents. Using differentiable measures can be used as objective functions for optimizing robotic behaviour towards maximizing the cooperation measure. Achieving a state of optimized cooperation results in increased efficiency in performing tasks, improved task success, increased acceptance, and usability.

Achieving cooperative behaviour of the agents acting together towards the shared goal, while the agents mutually adapt their behaviour in order to facilitate the realization of the shared goal improves complementing each agents' abilities and compensating individual potential deficits of each agent. The method augments each agent's ability and support the agent's actions in order to reach the common goal more efficiently, to increase usability and operator satisfaction.

Current approaches are usually tailored to specific scenarios and use a-priori knowledge of possible strategies and behaviours of the human operator participating in addressing the shared goal. Contrary thereto, the method generalizes beyond the specific scenario and robotic system. The method generalizes to create a truly autonomous system in order to maximize the joint efficiency of the autonomous device and the at least one other agent when working towards the shared goal. Neither strong supervision, nor specific guidance of the autonomous device by a human operator posing as the other agent is required.

Contrary to the current approaches, the method presents a general framework for quantifying cooperation and using a measure that quantifies the cooperation for planning robot behaviour. This approach maximizes cooperative behaviour in a human-machine interaction or multiple agent interaction addressing the shared goal. Quantifying the degree of cooperation enables designing a motion planning scheme that uses the cooperation measure as an objective in optimizing collaborative behaviour in widely differing scenarios. The method proposes a framework that is thus independent of a specific task and embodiment of the autonomous device. The method is able to quantify cooperation of plural agents under mild prerequisites and assumptions in a wide range of scenarios. The method scales with an increasing autonomy of the autonomous device, e.g., a robot that does not rely on human supervision by the operator. Implementing the method in a controller achieves a flexible behaviour planning with increased task success and usability in scenarios involving a physical human-robot collaboration.

The method according to an embodiment comprises obtaining the variables including obtaining at least one first variable that describes an action of the at least one agent, and at least one second variable that describes an action of the autonomous device. The step of obtaining the further variable includes obtaining at least one third variable that describes the current state of the common environment or of the at least two agents with respect to the target state of the common environment.

According to an embodiment, the method has the at least one first variable including at least one of measured biophysical signals, in particular electromyography (EMG) signals, predictive gazing and automatic imitation signals measured by eye tracking and EMG, galvanic skin conductance and ocular activity signals, force of motion signals measured from motor activity of the at least one agent, poses of the agent estimated based on images acquired by the autonomous device, and trajectories calculated based on motion tracking.

The at least one second variable may include at least one of joint positions, motion trajectories, forces, and velocities of the autonomous device.

The at least one third variable includes at least one of a measure of a current task success, a distance, in particular an Euclidian distance to a target state of the common environment, and a first derivative of the distance.

The method according to an embodiment determines the quantitative measure by applying an information-theoretic partial information decomposition (PID) framework to the first and second variables as input variables and the third variable as output variable, in particular applies the PID framework to quantify a synergistic contribution of the first and second variables as the input variables and the third variable as the output variable.

According to an embodiment of the method, determining the quantitative measure applies a linear model to quantify a synergistic contribution of the first and second variables as input variables and the third variable as output variable.

According to an embodiment of the method, in addition to the quantitative measure quantifying a synergistic contribution of the first and second variables as input variables and the third variable as output variable, optimizing the joint behaviour of the at least two agents uses a distance to the target state as a constraint or uses an derivative of the distance having a negative value as a constraint, or maximizes the measure of current task success as a constraint.

According to an embodiment of the method optimizing a joint behaviour of the at least two agents comprises optimizing a future target state of the at least one autonomous device by applying an optimization algorithm using the determined quantitative measure, and applying a trajectory planning strategy to generate a trajectory to the optimized future target state.

Applying the optimization algorithm using the determined quantitative measure my comprise applying a gradient-based optimization algorithm on the determined quantitative measure, in particular applying gradient-based descent, or a non-gradient-based optimization algorithm, in particular an evolutionary algorithm, or a Bayesian optimization algorithm.

The method according to one embodiment may comprise in the step of optimizing the joint behaviour of the at least two agents, determining at least one action of the autonomous device by applying a trajectory planning strategy, in particular a trajectory planning strategy for co-manipulation scenarios, to generate a trajectory to the optimized future target state.

According to an embodiment of the method, optimizing the joint behaviour of the at least two agents comprises using the determined quantitative measure directly in an objective function or as a constraint during optimizing at least one motion trajectory to generate a trajectory to an optimized future target state, in particular by a sampling based motion planning SBMP process or a trajectory optimization framework.

The step of optimizing the joint behaviour of the at least two agents comprises achieving the optimized future target state using the SBMP process, may include steps of identifying trajectories between a start state and a target state of the autonomous device and of assigning cost to the identified trajectories based on a metric. The cost comprises an element of cooperation between the at least two agents based on the determined quantitative measure, and the step of optimizing the joint behaviour of the at least two agents further comprises selecting a trajectory with minimized cost for achieving the optimized future target state.

According to an embodiment, the method has the step of determining the quantitative measure for cooperative behaviour of the at least two agents comprising estimating the quantitative measure based on acquired data of actions or motions of the at least two agents and a corresponding target state, in particular based on the acquired data from past instances of performing the task, from observing humans interacting in performing the task, or from sampling the joint action space of the at least two agents.

The method according to an embodiment has the step of obtaining the variables on a current state of each of the at least two agents in the common environment including obtaining predictions on the at least two agents based on a known internal policy of the at least two agents or a past behaviour of the at least two agents.

Predictions on the at least two agents based on a past behaviour of the at least two agents may be acquired by applying a statistical model. The statistical model may be applied on historical data stored from past instances of performing the task, in particular historical data from the same agents performing the same or a similar task in the same task environment.

The at least two agents may comprise plural autonomous devices.

FIG. 1 illustrates the process of motion planning for a robot cooperating with other agent(s) in an exemplary application of an embodiment.

The method concerns control of an agent, which collaborates with at least one other agent in performing a shared goal in a common environment termed task environment 6. The task environment 6 corresponds to the common workspace of the agents.

The controlled agent is an autonomous device (robot, robotic system) R.

The at least one other agent H may include a human person H, which collaborates with the agent R.

At least one sensor monitors the task environment 6 and generates a sensor signal including sensor data on a current state of the task environment 6. The sensor signals include data on a state of each agent including a state of the autonomous device R and the state of the at least one other agent R, as well as a current state of the task. The at least one sensor may include, but is not limited to at least one camera sensor providing image data acquired on the task environment.

The at least one sensor may form part of a sensor of the autonomous device R.

The sensor signal is provided as a sensor feedback to a processor. The processor may form part of the autonomous device R. The processor may represent an arrangement of a plurality of processor circuits, microprocessors, or signal processors which together form with peripheral equipment, in particular memory for storing application program data and for storing data generated when executing the program on the processor.

Alternatively, the term processor may refer to a server or a plurality of servers which are connected with the at least one sensor on the one hand and the autonomous device R on the other hand via a communication network.

The method for controlling the autonomous device R generates command signals for controlling actions of the autonomous device R and outputs the generated command signals to a robot control module 5. The robot control module 5 generates control signals 12 for the actuators of the autonomous device R based on the received command signals and outputs the control signals 12 to the actuators, which perform actions of the autonomous device R as defined in the command signals. The actions of the autonomous device R influence the state of the autonomous device R, and via the state of the task environment, and the state of the goal (task), which the autonomous device R and the at least one other agent H intend to achieve in the task environment.

The method for controlling the autonomous device R obtains the sensor signal (sensory feedback) as input. The intended task or goal, which the autonomous device R and the at least one other agent intend to achieve is further input for the method.

The method includes three major steps or layers, which will be discussed in more detail with respect to the specific features of the cooperation of the agents in achieving the goal below. For an overview, it may suffice to explain in a short summary the major layers of the method for controlling the autonomous device R. The processing sequence 1 of the three major layers implements the method performing control of the autonomous device R, and uses the quantitative measure for cooperative behaviour for implementing a cooperative collaboration of the autonomous device R and the at least one other agent H towards the shared goal in the task environment 6.

The first layer is the interaction layer 2. The interaction layer 2 obtains the sensor feedback from the task environment and the task as inputs and generates, based on the input, a target for the subsequent planning layer 3.

The planning layer 3 determines actions for execution by the autonomous device R in order to approach the target defined by the interaction layer 2.

The motion generation layer 4 obtains the actions determined by the planning layer 3, and generates commands for execution by the autonomous device R in order to perform the actions determined in the planning layer 2. The motion generation layer 4 outputs the generated commands to the robot control 5, which provides for the actual execution of the determined actions by the autonomous device R.

The method for controlling the autonomous device R differs from current approaches of controlling robots by the specific processing in the interaction layer 2 and the planning layer 3, which provide for a cooperative approach in addressing the task in the task environment 6, which significantly extends the current approach taken by collaborating agents in performing the task. This specific cooperative approach uses a set of variables describing the task environment 6 as input to the processing, which will be discussed with reference to FIG. 2.

Figure 2:
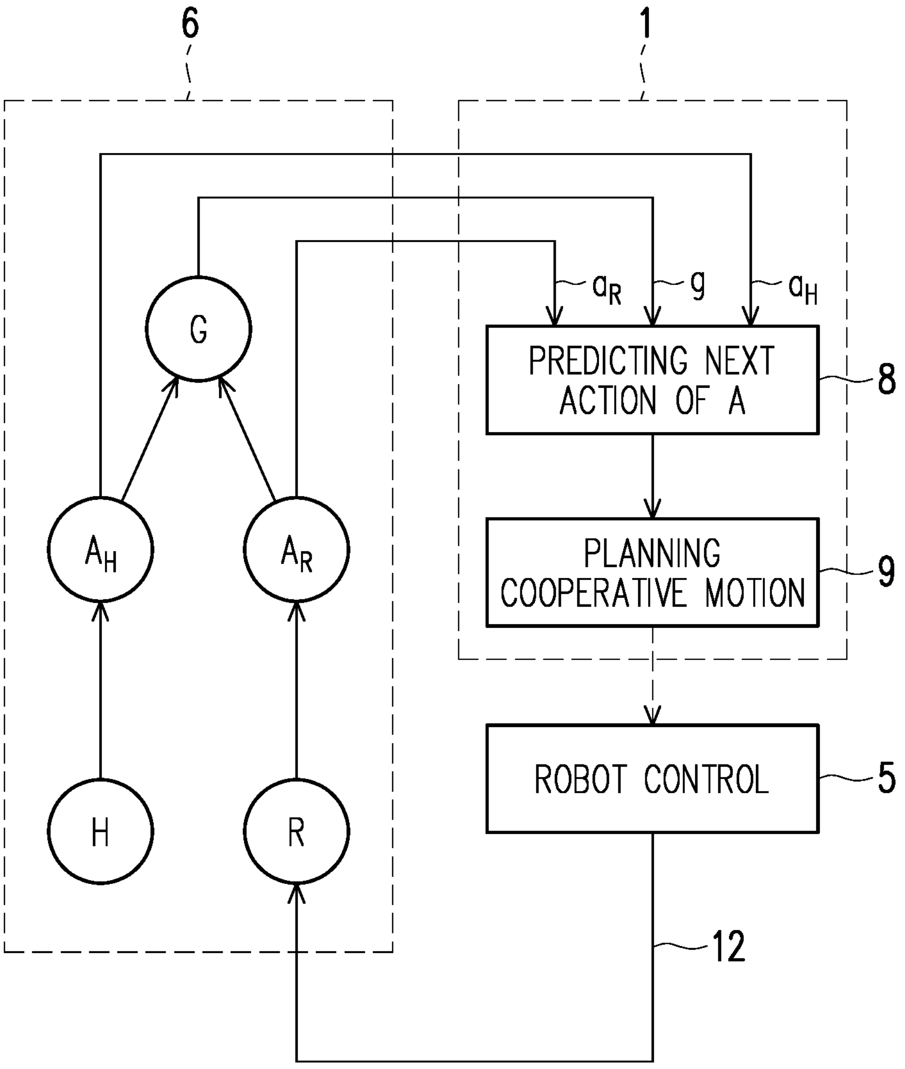
FIG. 2 illustrates variables describing the robot and one other agent in their common environment according to an embodiment.

FIG. 2 illustrates variables describing the autonomous device R, one other agent H, and the state of the shared goal in their common task environment 6 and the inventive approach according to an embodiment.

The left portion of FIG. 2 illustrates the abstract description of the task environment 6 including the autonomous device R, the one other agent H, and the state of the shared goal termed goal state G, for performing the cooperative motion planning according to the embodiment. The right portion of FIG. 2 depicts the processing cycle with major steps of the method for controlling the autonomous device R.

The variables describing the actions of the agents and the goal state enable the method to measure, and in particular to quantify, a degree of cooperation between the agent H and an autonomous device (robot) R by defining a dedicated measure of cooperation and to integrate the measure of cooperation into action planning in order to increase cooperation between the agent and the autonomous device. The following paragraphs describe the method assuming a human operator H as one agent is interacting with the autonomous device as a robotic agent R. However, the description may equally apply to an artificial software system.

The dedicated measure of cooperation corresponds to the quantitative measure for cooperative behaviour, and will be used as cooperative measure c thereafter.

For quantifying the degree of cooperation in joint behaviour of the at least two agents, the method bases on defining measurable variables $a_h$ and $a_r$ that describe both, actions $A_H$ of the agent and actions $A_R$ of the autonomous device. A further measurable variable g describes at least one of the current state of the environment and the current state of the agents H, R with respect to an intended (joint) goal state G. The intended goal state corresponds to a target goal state.

The variable g describing the goal state may for example describe a Euclidean distance g to a goal, in particular a goal configuration. The variable may also describe the current task success, thereby providing a measure for current task success.

Alternatively, the variable g describing the goal state may for example describe a first derivative g' of the distance to the goal. Hence the variable g describes whether the goal is approached with elapsing time and with the actions A that are executed. Approaching the goal decreases the distance to the goal. Otherwise, the executed actions do not decrease the distance to the goal.

In FIG. 2 and thereafter, capital letters indicate an abstract random variable describing a concept. Lowercase letters indicate quantities, which are actually measured in the environment of the agents.

The measurable variables at describing the actions of the agent H may include biophysical signals, e.g., motor signals measured by EMG, a variable describing predictive gazing and automatic imitation measured by eye tracking of the agent H, a variable based on a galvanic skin conductance and an ocular activity of the agent H, a variable based on signals derived from motor activity such as the force of a motion of the agent H, a variable that bases on poses estimated from a vision of the agent H, or a variable determined based on motion trajectories measured by performing motion tracking of the agent H.

The measurable variable $a_h$ describing the actions of the agent H may include a combination of variables.

Measurable variables $a_r$ describing the actions of the autonomous device R may include variables that are determined based on parameters such as joint positions, motion trajectories, a force, or a velocity.

The measurable variable $a_r$ describing the actions of the autonomous device R may include a combination of variables.

The actions A, R are used as a proxy to infer an internal state or a policy of the respective agent. Alternatively to observable or measurable actions, or in addition thereto, other means to infer the state of the agents H, R may be used, e.g. a prediction of actions of the respective agent H, R based on knowledge of an internal policy of the respective agent H, R, or based on knowledge of a past behaviour of the respective agent H, R when performing the current task, when performing at least one of a similar task and the same task.

The current goal state g may be described by a measurable quantity, e.g., the Euclidean distance to a goal configuration.

The cooperative motion planning bases on observable variables. The right portion of FIG. 2 depicts the sequence of steps of the method, which apply the discussed set of variables for controlling the autonomous device R.

In step 8, a next action $$\hat{a}_h^{i+1}$$

of the agent H is predicted based on the obtained current variables $a_r$, $a_h$, and g. The predicted next action $$\hat{a}_h^{i+1}$$

of the agent H, the next action $$a_R^{i+1}$$

of the autonomous device R is determined in subsequent step 9. Step 9 implements the cooperative action selection and motion planning.

The cooperative action selection and motion planning optimizes the next action $$a_R^{i+1}$$

of the autonomous device by optimizing a cooperation measure $$c(a_h, a_r, g) \tag{1}$$

that captures the joint, synergistic contribution of both agents, the other agent H and the autonomous device R towards reaching the goal state G. Based on the predicted next action $$\hat{a}_h^{i+1}$$

of the agent A and the current goal state g, in step 9, the next action next action $$a_R^{i+1}$$

of the autonomous device R is determined by optimizing the motion towards maximizing the measure of cooperation c.

The optimization then selects the next goal state of the robot according to $$\underset{a_R^{i+1}\in A_R}{\arg\max}\ c\left(a_R^{i+1}, \hat{a}_h^{i+1}, g\right) \tag{2}$$

In expression (2), $$a_R^{i+1}$$

denotes the next goal state of the agent R, $$\hat{a}_h^{i+1}$$

denotes the predicted next state of the agent H, and g describes the current goal state. Expression (2) that the next state $$\hat{a}_h^{i+1}$$

of the agent R can be predicted or observed when performing the optimization. The goal state is then optimized towards a cooperative action as defined above.

In step 9, the optimized goal state may then be provided to a motion planning module that generates the commands required to realize the optimized goal state.

The planning may be carried out using existing planning frameworks, e.g., known trajectory optimization procedures proposed for co-manipulation scenarios, as disclosed in in Gienger, M., Ruiken, D., Bates, T., Regaig, M., MeiBner, M., Kober, J., Seiwald, P., & Hildebrandt, A.-C., (2018). *Human-Robot Cooperative Object Manipulation with Contact Changes.* 2018 IEEE/RSJ International Conference on Intelligent Robots and Systems IROS, 2018, pp. 1354-1360.

For selecting a goal state by using the cooperation measure c, a known optimization algorithm may be used. In case the measure c is differentiable, e.g., the differentiable synergy measure proposed in Makkeh, A., Gutknecht, A. J., & Wibral, M. (2021). Introducing a differentiable measure of pointwise shared information. *Physical Review E,* 103, 032149, gradient-based algorithms such as gradient descend may be applied.

In case the gradient of the cooperation measure c is not known, an optimization algorithm that does not rely on gradients may be used, e.g., evolutionary algorithms such as CMAES or Bayesian optimization discussed in Hansen, N. (2006). The CMA evolution strategy: a comparing review. *Towards a new evolutionary computation,* 75-102.

For planning a motion in step 9, the measure of cooperation c, may be used to optimize a goal state and apply existing trajectory planning strategies to reach this goal state.

Alternatively, the measure of cooperation c may be used directly in optimizing motion trajectories, e.g., by sampling-based motion planning or a trajectory optimization framework. The trajectory optimization framework may use the measure of cooperation c as part of the objective function. Alternatively, the trajectory optimization framework may use the measure of cooperation c as a constraint.

Both approaches will be discussed in more detail.

Sampling-based motion planning (SBMP) may be applied in order to use the cooperation planning in optimizing a motion trajectory of the agent R directly. Elbanhawi, M., Member, S., & Simic, M. (2014). Sampling-Based Robot Motion Planning: A Review. *IEEE Access,* 2, 56-77. and Ichter, B., Harrison, J., & Pavone, M. (2018). Learning Sampling Distributions for Robot Motion Planning. 2018 *IEEE International Conference on Robotics and Automation* (*ICRA*2), 7087-7094 may reveal further details for an implementation. SBMP is suitable for autonomous devices (robots) and assumes a configuration space (C-space) of all valid transformations of the robot, as well as free space and space occupied by obstacles present in the environment of the robot. The configuration q of the robot sufficiently describes the state of the robot. SBMP determines a path from a start configuration to a goal configuration of the robot by sampling the C-space, assigning a cost to different paths from the start configuration to the goal configuration, and thereby forming a graph of valid motions for the robot. In SBMP, the cost is assigned by applying a metric. Cost may be extended by not only considering a distance between two states of the robot to assign a cost to a configuration, but also considering a degree of cooperation.

Alternatively, the measure of cooperation c may be used to optimize the planned motion towards a maximum in cooperative behaviour in any other motion planning algorithm that allows for incorporating constraints or additional terms in its objective function. Thus, the measure of cooperation c is not restricted to be considered for motion planning using SBMP.

Concerning the parameters used in expression (2), it is notable that the actions $$a_R^{i+1},\ \hat{a}_h^{i+1}$$

in expression (2) may be scalar values.

Alternatively, the actions $$a_R^{i+1},\ \hat{a}_h^{i+1}$$

in expression (2) are vectors including a set of parameters that define the next action of each agent, e. g. the agent H and the autonomous device R. In a particular example, the set of parameters define a motion trajectory. The set of parameters may, for example, define the motion trajectory using parameters defining a pose of an agent, the pose of the agent including parameters that specify the position of the agent in the environment and the orientation of the agent, as well as defining a velocity of the agent.

The determined next action $$a_R^{i+1}$$

of the autonomous device R is then used to perform control of the autonomous device R in step 5. Step 5 of FIG. 2 generates a control signal 12 for controlling the autonomous device R based on the determined next action $$a_R^{i+1}$$

of the autonomous device R, and outputs the generated control signal 12 to the autonomous device R for execution.

Independent from the chosen implementation for incorporating the measure of cooperation c into motion planning c in step 9, measure of cooperation c is estimated from data, that is data of actions or motions of both agents R and H and the corresponding goal state g. The data for estimation of the measure of cooperation c may be obtained during previous runs of the goal.

Alternatively or additionally, the data for estimation of the measure of cooperation c may be obtained from observations of a person interacting with the agent R.

Alternatively or additionally, the data for estimation of the measure of cooperation c may be obtained by a sampling of the action space as it is discussed in Ichter, B., Harrison, J., & Pavone, M. (2018). Learning Sampling Distributions for Robot Motion Planning. 2018 *IEEE International Conference on Robotics and Automation* (*ICRA*2), 7087-7094.

The approach quantifies cooperation between the two agents, in the discussed example the agent H as the human and the agent R as the autonomous device, as the synergy between variables. The variables describe the relevant actions of both agents H, R and may represent parameters of the agents H, R, e.g., motor outputs. The method enables evaluating a degree of cooperation in a human-machine, or machine-machine system by the measure of cooperation c.

Furthermore, the measure of cooperation c enables controlling cooperative behaviour in a collaborative, autonomous agent R by using the measure of cooperation c in a target function that guides the optimization of the behaviour of the agent R.

Implementations may use the measure of cooperation c as an objective in optimizing a goal state.

Alternatively, implementations may use the measure of cooperation c in trajectory planning as either an objective or a constraint.

The method allows to optimize the behaviour of the agent R towards a cooperative behaviour in a manner, which is driven by data. The approach is particularly advantageous, as the approach enables a flexible exploration of the solution space of collaborative actions. The approach does not require to define a model or a description of cooperative behaviour for a specific task a-priori.

Figure 3:
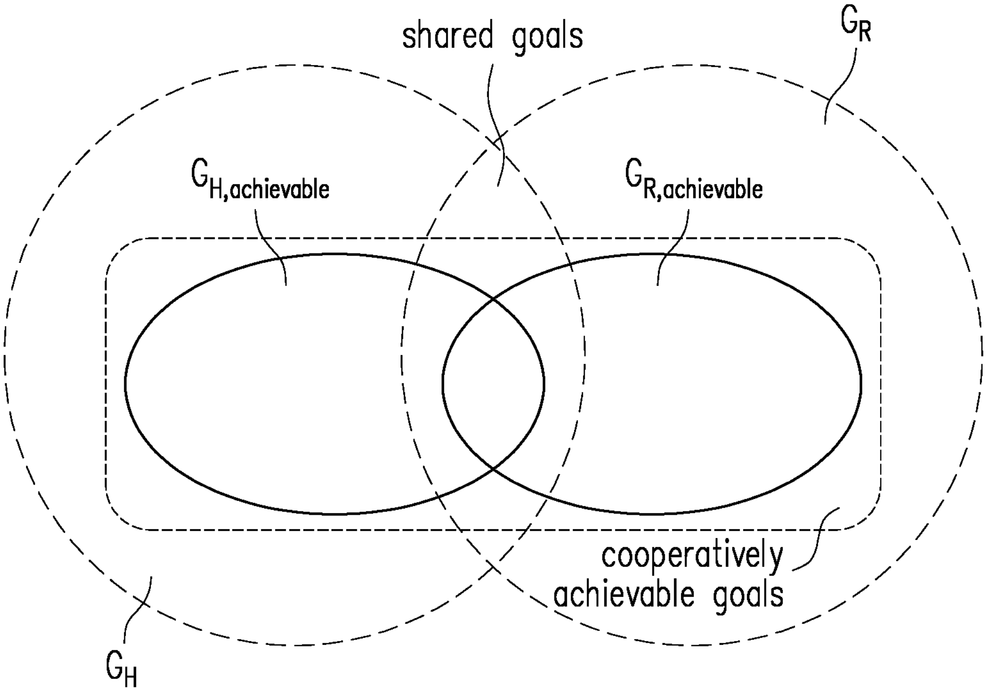
FIG. 3 illustrates the space of the goals $G_H$ and $G_R$ of two agents H and R cooperating with each other.

FIG. 3 illustrates the space of the goals $G_H$ and $G_R$ of two agents H and R cooperating with each other.

In particular, the cooperation measure defines cooperation of the at least two agents as a contribution that is exclusively provided when considering actions $a_H$ and $a_R$ of the agents H and R jointly. FIG. 3 illustrates the concept for the cooperation measure c. FIG. 3 shows the spaces of potential and realizable goals of each agent. In FIG. 3, $G_H$ denotes potential goals of agent H. $G_R$ denotes potential goals of agent R in FIG. 3.

Both agents, H and R can individually realize a subset of their respective goals depicted by the elliptic areas in FIG. 3.

Agent H may realize the goals $G_{H,\ achievable}$. Agent R may realize the goals $G_{R,\ achievable}$.

The scenario of FIG. 3 assumes that some goals are shared between both agents H and R respectively. FIG. 3 represents the shared goals of agent H and agent R by an overlapping area of both the potential goals $G_H$, $G_R$, and the reachable goals $G_{H,\ achievable}$, $G_{R,\ achievable}$.

Figure 4:
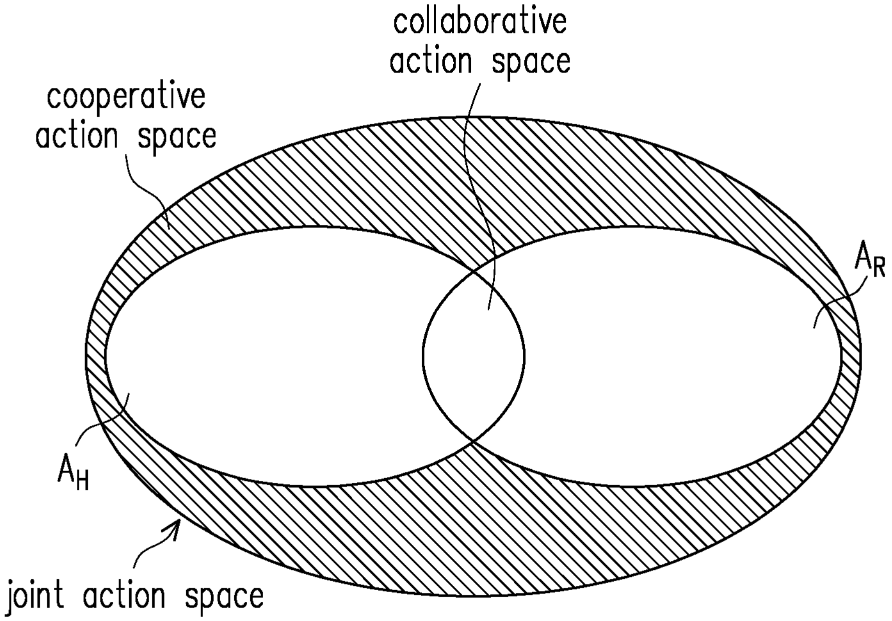
FIG. 4 illustrates the spaces of potential actions $A_H$ and $A_R$ towards a specific shared goal.

FIG. 3 illustrates the effect of the approach using the defined cooperation measure c for cooperative motion planning by the rectangular area that includes the large subset of the larger subset of the union of $G_H$ and $G_R$ that is realizable when H and R cooperate in achieving the goal. For making previously unreachable goals achievable by performing cooperative behaviour, cooperation must entail that both agents complement or augment their respective abilities in order to form a collaborating system. The joint actions of the collaborative system cover a larger space than each agent's individual actions, as FIG. 4 illustrates. The (extended) cooperative action space shown by the shaded area in FIG. 4 is defined by the individual abilities of the agent H and of the agent R characterizes the cooperation of the agents H and R. Contrary thereto, collaboration between the agents H and R denotes an aggregation of both agents' abilities without an augmentation of the ability of each individual agent H and R. FIG. 4 denotes collaboration between the agents H and R in the collaborative action space which represents the pooled action spaces $A_H$ and $A_R$ of the agents A and H.

FIG. 4 illustrates the spaces of potential actions $A_H$ and $A_R$ towards a specific shared goal.

The agents, H and R, contribute individual actions, $A_H$ and $A_R$ shown by the grey elliptic areas of white interior colour in FIG. 4. Some of these actions may be performed redundantly by either agent H or agent R. FIG. 4 depicts the redundant actions by the overlapping area of the areas $A_H$ and $A_R$ shown by their respective grey elliptic areas. The redundant actions are actions that both agents are capable of contributing. Some actions can only be performed jointly by the agents H and R through cooperative behaviour shown in FIG. 4 by the shaded area of the cooperative action space. The actions in the cooperative action space may be performed by neither of the agents H and R alone. Hence, the cooperative action space defined by such cooperative actions denotes a behaviour that can only be realized jointly by the agent H in cooperation with the agent R. The cooperative action space exceeds the individual action space of each agent H and R alone, and the redundant action space. The cooperative action space does not include the individual action space of each agent H and R and the redundant action space. In comparison, the collaborative action space is defined by the white area, comprising the individual and redundant actions of both agents.

Figure 5:
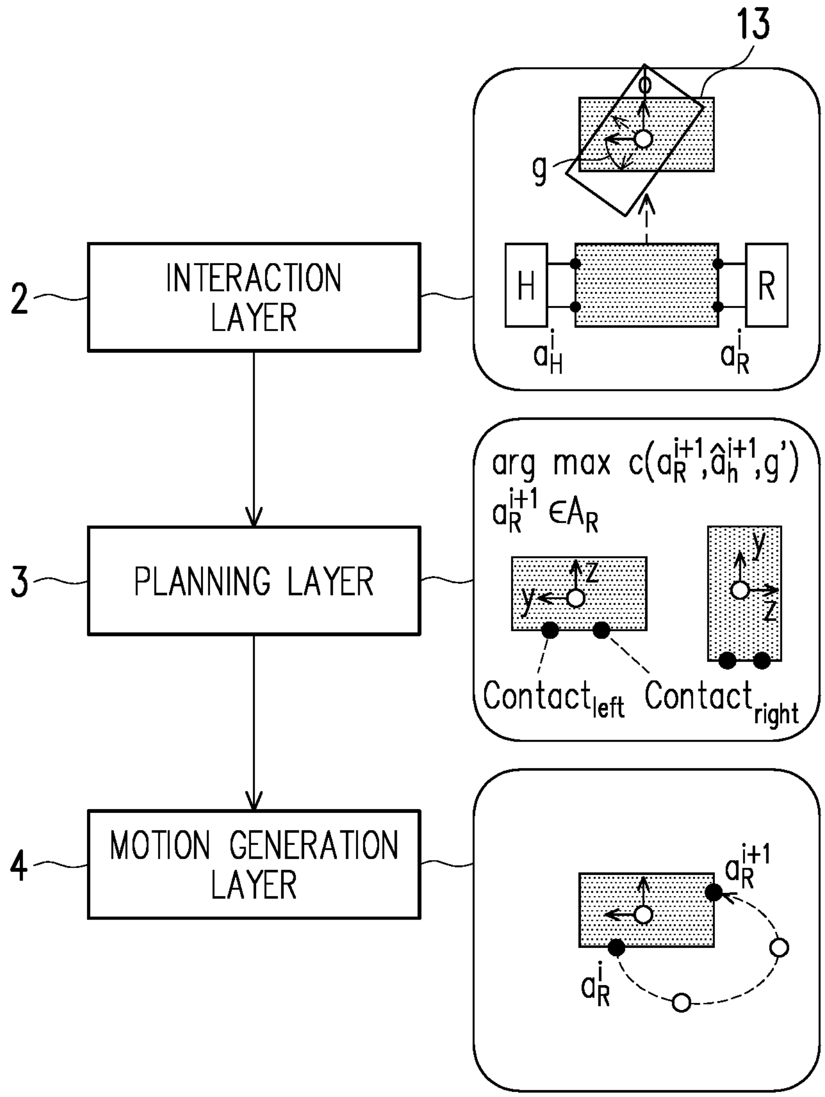
FIG. 5 shows the process of motion planning for a robot cooperating with the human in an example scenario applying an embodiment.

The publication Gienger, M., Ruiken, D., Bates, T., Regaig, M., Meißner, M., Kober, J., Seiwald, P., & Hildebrandt, A.-C., (2018). *Human-Robot Cooperative Object Manipulation with Contact Changes*. 2018 IEEE/RSJ International Conference on Intelligent Robots and Systems IROS, 2018, pp. 1354-1360, describes ascenario of a robot as an example of an autonomous device R and a human H representing at least one other agent H cooperating in a box-turning setup showing a potential application of the method. The goal of the application example is to jointly rotate the box 13 by 180 degrees. FIG. 5 illustrates schematically the application example in the task environment 6 in the right portion of FIG. 5.

The autonomous device R may be a collaborative robot with sufficient dexterity and autonomy such as to be capable of a cooperative behaviour. In particular, the autonomous device R is capable of cooperative behaviour by selecting of a suitable action from a wide range of possible alternative actions. The autonomous device R is equipped with sensor(s) to perceive the environment, e. g. the task environment, of the autonomous device R to a degree necessary for fulfilling the shared task. The autonomous device R comprises sensors, which generate sensor data in the sensor signal, that includes a current perception of the cooperating at least one other agent H and the shared goal that the autonomous device R and the at least one other agent H intend to achieve. The autonomous device comprises a configuration of sensors, actuators, and an integrated control system (controller) that provides a significant level of flexible, independent, and autonomous action.

The autonomy of the autonomous device R includes the autonomous device R sensing the task environment 6, performing planning based on the sensed task environment, and acting in a suitable manner based upon the sensed task environment, based on the performed planning, with the intent of reaching the goal without requiring an external control or guidance.

A task efficiency may be defined as the time needed to rotate the box into the target position and the number of failed attempts to rotate the box 13 into the target position.

The example guides the motion planning of the autonomous device R by determining an optimal next action of the autonomous device R that minimizes a distance to the goal state, while being maximally cooperative as measured by the measure of cooperation c.

FIG. 5 illustrates the basic setup for motion planning as shown in FIG. 1. An interaction layer 2 obtains the sensory feedback from the task environment 6. The sensory feedback describes the current action $a_h$ of the human corresponding to agent H. The obtained sensory feedback as input may comprise a current rotation angle $\phi$ of the box 13, a visual input on the current location hands of the human, and information on fixations or a gaze direction obtained by performing eye tracking. Using data obtained from the task environment 6 by the sensor(s). Furthermore, a distance to a goal state g', can be measured as the difference between the current rotation angle $\phi$ and a goal rotation angle $\phi_{goal}$.

Based on obtained sensory feedback as input, a next intended action, $$\hat{a}_h^{i+1}$$

of the human is estimated in the interaction layer 2 and communicated to the planning layer 3.

In the known approaches, an a-priori defined action is chosen for the autonomous device R based on the estimated next action $$\hat{a}_h^{i+1}$$

of the human. The human's action determines the collaborative strategy and thereby determines, which of the next actions of the autonomous device R an optimal action for approaching the goal is. This approach assumes that there is a single collaborative strategy to optimally rotate the box. However, the assumption of a single suitable strategy may not be warranted in general, especially when collaborating with different humans, and may even require explicit instruction of the human to perform the task in a specific manner.

Accordingly, the present approach deviates from assuming a single optimal strategy a-priori, and optimizes the next action of the autonomous device R to be maximally cooperative according to the measure of cooperation c. The next action $$a_R^{i+1}$$

of the autonomous device R is selected from the set of possible actions $A_R$ such that the cooperation represented by the measure of cooperation c is maximized. This is formulated as an objective function, $$\underset{a_R^{i+1} \in A_R}{\arg\max}\ c\left(a_R^{i+1}, \hat{a}_h^{i+1}, g'\right) \text{ subject to } g' < 0. \tag{3}$$

The set $A_R$ is defined as follows: In the scenario, the task of rotating the box 13 is defined as a planar problem, in which the current state of the task environment is described by $$s = (\phi, \text{Contact}_{right}, \text{Contact}_{left}), \tag{4}$$

with a current rotation angle $\phi$ of the box 13, and the contact locations Contact of the right manipulator and the left manipulator of the autonomous device R. The set of actions is thus defined by all re-grasping operations with either the right or the left manipulator along the edge of the box 13, leading to a new contact position.

Measuring the variables reliably, the degree of cooperation c can be quantified by estimating the synergy between $$\hat{a}_h^{i+1} \text{ and } a_R^{i+1}$$

with respect to g'. The synergy may be estimated using an estimator. An example for such an estimator is proposed in Makkeh, A., Theis, D. O., & Vicente, R. (2018). BROJA-2PID: A robust estimator for bivariate partial information decomposition. *Entropy,* 20(4). The distributions of all variables required for the estimation may be learned over repetitions of the task. This may be implemented by performing repeated training runs on a task that allows to collect sufficient data for the estimation. The estimated synergy value may then be used in the optimization of the objective function, e.g., using an evolutionary strategy.

Alternatively, the distributions of all variables required for the estimation may be determined by an observation of human collaborators.

Alternatively a different, differentiable synergy measure may be used as shown in Makkeh, A., Gutknecht, A. J., & Wibral, M. (2021). Introducing a differentiable measure of pointwise shared information. *Physical Review E,* 103, 032149. The differentiable synergy measure enables that a gradient-based method can be applied to perform the optimization.

The new optimized new contact location is passed on to the motion generation layer 4 in FIG. 5 to convert the optimized action determined in the motion generation layer 4 into continuous task-space trajectories for execution in in the task environment 6, and to compute the corresponding commands for the robot.

Gienger, M., Ruiken, D., Bates, T., Regaig, M., Meißner, M., Kober, J., Seiwald, P., & Hildebrandt, A.-C., (2018). *Human-Robot Cooperative Object Manipulation with Contact Changes.* 2018 IEEE/RSJ International Conference on Intelligent Robots and Systems IROS, 2018, pp. 1354-1360, provides further details for the concrete implementation of the trajectory generation and motion control.

Figure 6:
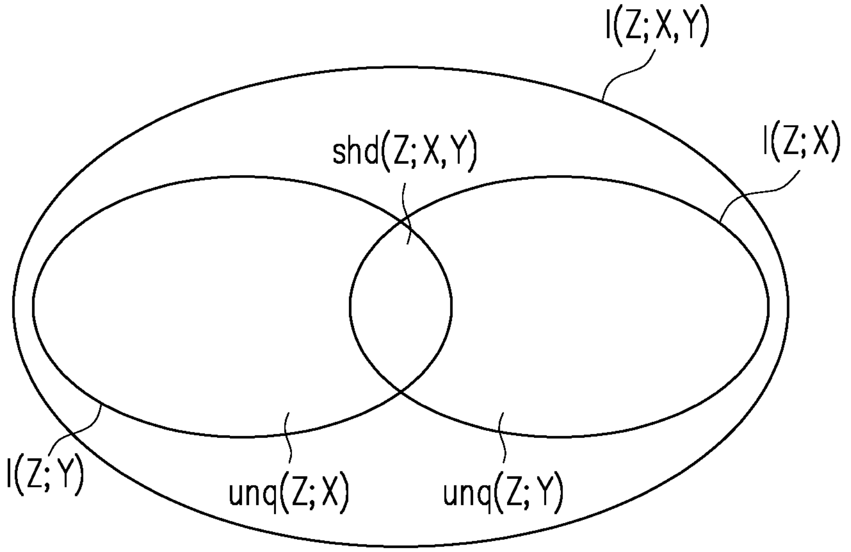
FIG. 6 illustrates the schematic presentation of information provided by two input variables X and Y about a target variable Z in partial information decomposition framework applied in an embodiment.

FIG. 6 illustrates the schematic presentation of information provided by two input variables X and Y about a target variable Z in a partial information decomposition framework PID according to an embodiment.

Generally, the partial information decomposition framework PID provides a schematic representation of information provided by two input variables, X and Y, about a target variable, Z. The two inputs provide information either uniquely Unq(Z;X) and Unq(Z;Y)), redundantly Shd(Z;X, Y), or synergistically Syn(Z;X,Y) as illustrated in FIG. 6.

In present embodiment, the method decomposes the actions $A_H$ and $A_R$ the two agents H and R contribute with respect to a joint goal G, into three components:

1) each agent H and R provides an individual or unique set of actions, that is only available to that agent H, R;
2) there may be a set of redundant actions available to both agents H, R; and
3) there is a set of joint actions that provides a synergistic contribution. The synergistic contribution can only be provided when taking the individual abilities of both agents H and R together. The synergistic contribution cannot be provided by one agent H, R alone. The synergistic contribution characterizes a cooperative interaction of the agents H and R towards the shared goal of the agents H and R.

The method proposes the measure of cooperation $c(a_h, a_r, g)$ that captures the joint, synergistic contribution of both agents H and R towards reaching the goal state and quantifies whether a cooperation of the agents H and R takes place that enables the reaching of goals previously unachievable. An implementation for quantifying the unique, the redundant, and the synergistic contributions from data represents the framework of partial information decomposition (PID) in information theory, which is illustrated in FIG. 6.

Generally, the PID framework provides measures to quantify unique, shared, and synergistic contributions of two or more input random variables X and Y towards a target random variable Z. Recent publications, e.g., Makkeh, A., Gutknecht, A. J., & Wibral, M. (2021). Introducing a differentiable measure of pointwise shared information. *Physical Review E,* 103, 032149, have introduced PID estimators that allow to estimate unique, shared, and synergistic contributions for individual realisations of random variables, which allows to quantify the synergistic contribution of two single action towards the current goal state, g.

Applying the PID framework in within present method includes variables representing actions as input variables and the current goal state as an output variable. An implementation of the disclosure applies the PID framework, in particular the synergy of the PID framework, as the measure of cooperation $c(a_h, a_r, g)$.

Alternatively, linear models may be used to quantify synergistic contributions between two or more inputs with respect to an output and may form basis for further embodiments of the method.

Figure 7:
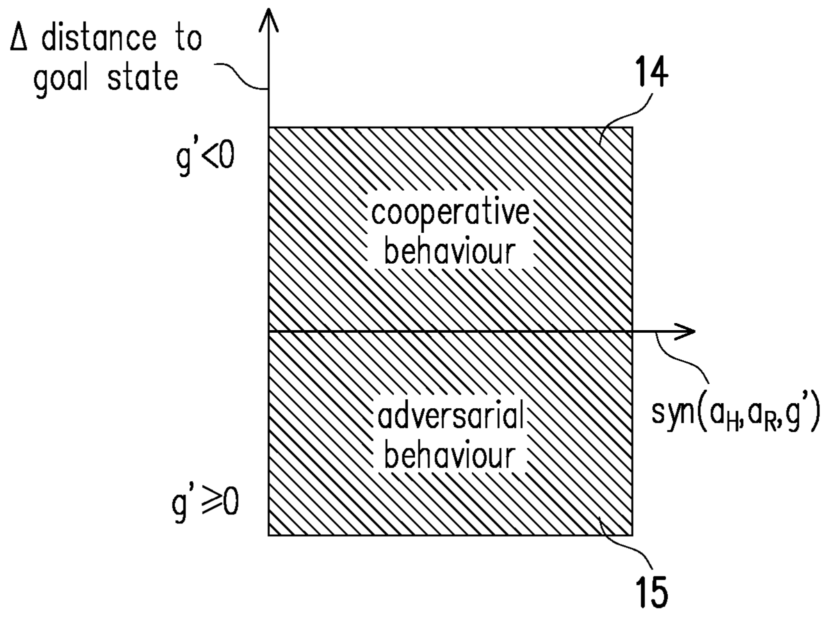
FIG. 7 illustrates an estimation of cooperation as high synergy while decreasing a distance to an intended target state.

If the synergy measure of PID is used to quantify the cooperation of agents in the measure of cooperation $c(a_h, a_r, g)$, a distance to the target state may be considered as a constraint to explicitly exclude adversarial behaviour of one or both of the agents as illustrated in FIG. 7.

FIG. 7 illustrates an estimation of cooperation as high synergy while simultaneously decreasing a distance to an intended target state.

The synergy itself quantifies joint contributions that affect the goal. The synergy does not provide a modelling how the value of the goal state is affected. In consequence, a collaborative action that leads to an increase in the g' and thus an increased distance to the goal state g may also lead to a high synergy. Specific embodiments of the method may address this issue. Such adversarial behaviour may be excluded by design.

Alternatively or additionally, the constraint $$g' < 0 \qquad (5)$$

may be added for the step of optimizing the behaviour. This illustrated by FIG. 7, in which the abscissa indicates the synergy syn $(a_h, a_r, g')$. The ordinate axis indicates the distance to the goal state. A cooperative behaviour is characterized by a high synergy, while simultaneously the distance to the goal state decreases, in particular $g'<0$ applies for a cooperative behaviour in area 14 of FIG. 7.

In case of an adversarial behaviour, the synergy is also high, while at the same time the distance to the goal state remains the same or even increases, e. g. $g' \geq o$ applies in case of the adversarial behaviour in area 15 of FIG. 7.

The description of implementations of the method is not limited to guiding collaborative behaviour between a human acting as the agent H and an autonomous device as the agent R. The method may be applied in systems including a plurality of agents (multi-robot systems) for optimizing collaborative behaviour towards a cooperative behaviour. In such implementations for multi-robot systems, the cooperative actions generated by the method achieve corresponding advantages compared to the attempts to arrive at collaboration solutions, for example, achieved by information sharing in known approaches.

Additionally, the optimization that identifies a next action of the agent R is equally applicable in artificial systems based on software systems to identify actions that are maximally cooperative in an entirely corresponding manner.

The method for controlling the autonomous device is discussed by referring examples of robots within a suitable embodiment, in particular, a physical instantiation that allows for a direct physical collaboration with the at least one other agent, whether a second robot or a human operator. However, the cooperation measure may also be quantified for artificial agents implemented in software, wherein the artificial agents are able to perceive the state of the other agent, and a human operator, and have the ability of making autonomous choices.

Embodiments of the inventive method defined in the claims may applied in the area of robotic systems. Particular application examples include assistance systems for humans with disabilities or in rehabilitation. Another application area concerns assembly lines in manufacturing sector or the logistics sector, both sectors employing robotic systems already in a large scale. Industrial application areas cover the increasing field of digitalized industrial processes generally referred to under the term “Industry 4.0”.

Service robotics may also benefit from the improved human-machine-interaction provided by the embodiments. This includes, but is not limited to, the field of cooperative design involving plural agents or cooperative strategies for smart-charging or energy management, for example.

In the specification and the claims, the expression “at least one of A and B” may replace the expression “A and/or B” and vice versa due to being used with the same meaning. The expression “A and/or B” means “A, or B, or A and B”.

The invention claimed is:

1. Method for controlling at least one autonomous device, which is at least one of at least two agents that cooperatively perform a common task in a common environment, the method comprising:

obtaining variables on a current state of each of the at least two agents in the common environment;

obtaining a further variable on at least one current state of the common environment, wherein the variable describes a distance of the current state of the at least two agents to a common goal state or a current task success;

determining a quantitative measure for cooperative behaviour of the at least two agents, wherein the quantitative measure quantifies an extent to which a mutual support or an adaption in joint cooperative actions towards the common goal state increases a joint action space of the at least two agents, wherein determining the quantitative measure applies an information-theoretic partial information decomposition (PID) framework to quantify a synergistic contribution of actions of the at least two agents to the common goal state or the current task success;

optimizing a joint behaviour of the at least two agents using the determined quantitative measure based on the obtained variables of the current states of the at least two agents and the obtained further variable on the current state of the common environment;

determining at least one action of the autonomous device based on the optimized joint behaviour; and outputting a control signal for controlling the determined at least one action.

2. The method according to claim 1, wherein obtaining the variables includes obtaining at least one first variable that describes an action of the at least one agent, and at least one second variable that describes an action of the autonomous device, and obtaining the further variable includes obtaining at least one third variable that describes the current state of the common environment or of the at least two agents with respect to a target state of the common environment.

3. The method according to claim 2, wherein the at least one first variable includes at least one of measured biophysical signals, in particular electromyography signals, predictive gazing and automatic imitation signals measured by eye tracking and EMG, galvanic skin conductance and ocular activity signals, force of motion signals measured from motor activity of the at least one agent, poses of the agent estimated based on images acquired by the autonomous device, and trajectories calculated based on motion tracking.

4. The method according to claim 2, wherein the at least one second variable includes at least one of joint positions, motion trajectories, forces and velocities of the autonomous device.

5. The method according to claim 2, wherein the at least one third variable includes at least one of a measure of the current task success, a distance to the target state of the common environment, in particular an Euclidian distance to the target state of the common environment, and a first derivative of the distance.

6. The method according to claim 2, wherein determining the quantitative measure applies the information-theoretic partial information decomposition (PID) framework to the first and second variables as input variables and the third variable as output variable, in particular applies the PID framework to quantify the synergistic contribution of the first and second variables as input variables and the third variable as output variable.

7. The method according to claim 2, wherein determining the quantitative measure applies a linear model to quantify a synergistic contribution of the first and second variables as input variables and the third variable as output variable.

8. The method according to claim 6, wherein in addition to the quantitative measure quantifying the synergistic contribution of the first and second variables as input variables and the third variable as output variable, optimizing the joint behaviour of the at least two agents uses a distance to the target state as a constraint or uses a derivative of the distance having a negative value as a constraint or maximizes the measure of the current task success as a constraint.

9. The method according to claim 7, wherein in addition to the quantitative measure quantifying the synergistic contribution of the first and second variables as input variables and the third variable as output variable, optimizing the joint behaviour of the at least two agents uses a distance to the target state as a constraint or uses a derivative of the distance having a negative value as a constraint or maximizes the measure of the current task success as a constraint.

10. The method according to claim 1, wherein optimizing the joint behaviour of the at least two agents comprises optimizing a future target state of the at least one autonomous device by applying an optimization algorithm using the determined quantitative measure, and applying a trajectory planning strategy to generate a trajectory to the optimized future target state.

11. The method according to claim 10, wherein applying the optimization algorithm using the determined quantitative measure comprises applying a gradient-based optimization algorithm on the determined quantitative measure, in particular applying gradient-based descent, or a non-gradient-based optimization algorithm, in particular an evolutionary algorithm, or a Bayesian optimization algorithm.

12. The method according to claim 1, wherein optimizing the joint behaviour of the at least two agents comprises determining at least one action of the at least one autonomous device by applying a trajectory planning strategy, in particular a trajectory planning strategy for co-manipulation scenarios, to generate a trajectory to an optimized future target state.

13. The method according to claim 1, wherein optimizing the joint behaviour of the at least two agents comprises using the determined quantitative measure directly in an objective function or as a constraint during optimizing at least one motion trajectory to generate a trajectory to an optimized future target state, in particular by a sampling based motion planning (SBMP) process or a trajectory optimization framework.

14. The method according to claim 13, wherein optimizing the joint behaviour of the at least two agents comprises achieving the optimized future target state using the SBMP process, by identifying trajectories between a start state and a target state of the at least one autonomous device, assigning cost to the identified trajectories based on a metric, wherein the cost comprises an element of cooperation between the at least two agents based on the determined quantitative measure, and selecting a trajectory with minimized cost for achieving the optimized future target state.

15. The method according to claim 1, wherein determining the quantitative measure for cooperative behaviour of the at least two agents comprises estimating the quantitative measure based on acquired data of actions or motions of the at least two agents and a corresponding target state, in particular based on the acquired data from past instances of performing the task, from observing humans interacting in performing the task, or from sampling a joint action space of the at least two agents.

16. The method according to claim 1, wherein obtaining the variables on the current state of each of the at least two agents in the common environment includes obtaining predictions on the at least two agents based on a known internal policy of the at least two agents or a past behaviour of the at least two agents.

17. The method according to claim 1, wherein the at least two agents comprise plural autonomous devices.

18. Method for controlling at least one autonomous device, which is at least one of at least two agents that cooperatively perform a common task in a common environment, the method comprising:

obtaining variables on a current state of each of the at least two agents in the common environment, wherein obtaining the variables includes obtaining at least one first variable that describes an action of the at least one agent, and at least one second variable that describes an action of the autonomous device, wherein the at least one second variable includes at least one of joint positions, motion trajectories, forces and velocities of the autonomous device;

obtaining a further variable on at least one current state of the common environment, wherein the variable describes a distance of the current state of the at least two agents to a common goal state or a current task success, wherein obtaining the further variable includes obtaining at least one third variable that describes the current state of the common environment or of the at least two agents with respect to the target state of the common environment;

determining a quantitative measure for cooperative behaviour of the at least two agents, wherein the quantitative measure quantifies an extent to which a mutual support or an adaption in joint cooperative actions towards the common goal state increases a joint action space of the at least two agents, wherein determining the quantitative measure applies an information-theoretic partial information decomposition (PID) framework to the first and second variables as input variables and the third variable as output variable, in particular applies the PID framework to quantify a synergistic contribution of the first and second variables as input variables and the third variable as output variable;

optimizing a joint behaviour of the at least two agents using the determined quantitative measure based on the obtained variables of the current states of the at least two agents and the obtained further variable on the current state of the common environment;

determining at least one action of the autonomous device based on the optimized joint behaviour; and outputting a control signal for controlling the determined at least one action.

* * * * *